Jan. 20, 1931.                C. W. LEGUILLON                 1,789,822
          APPARATUS FOR MANIPULATING EXTENSIBLE STRIP MATERIAL
                         Filed Dec. 24, 1928
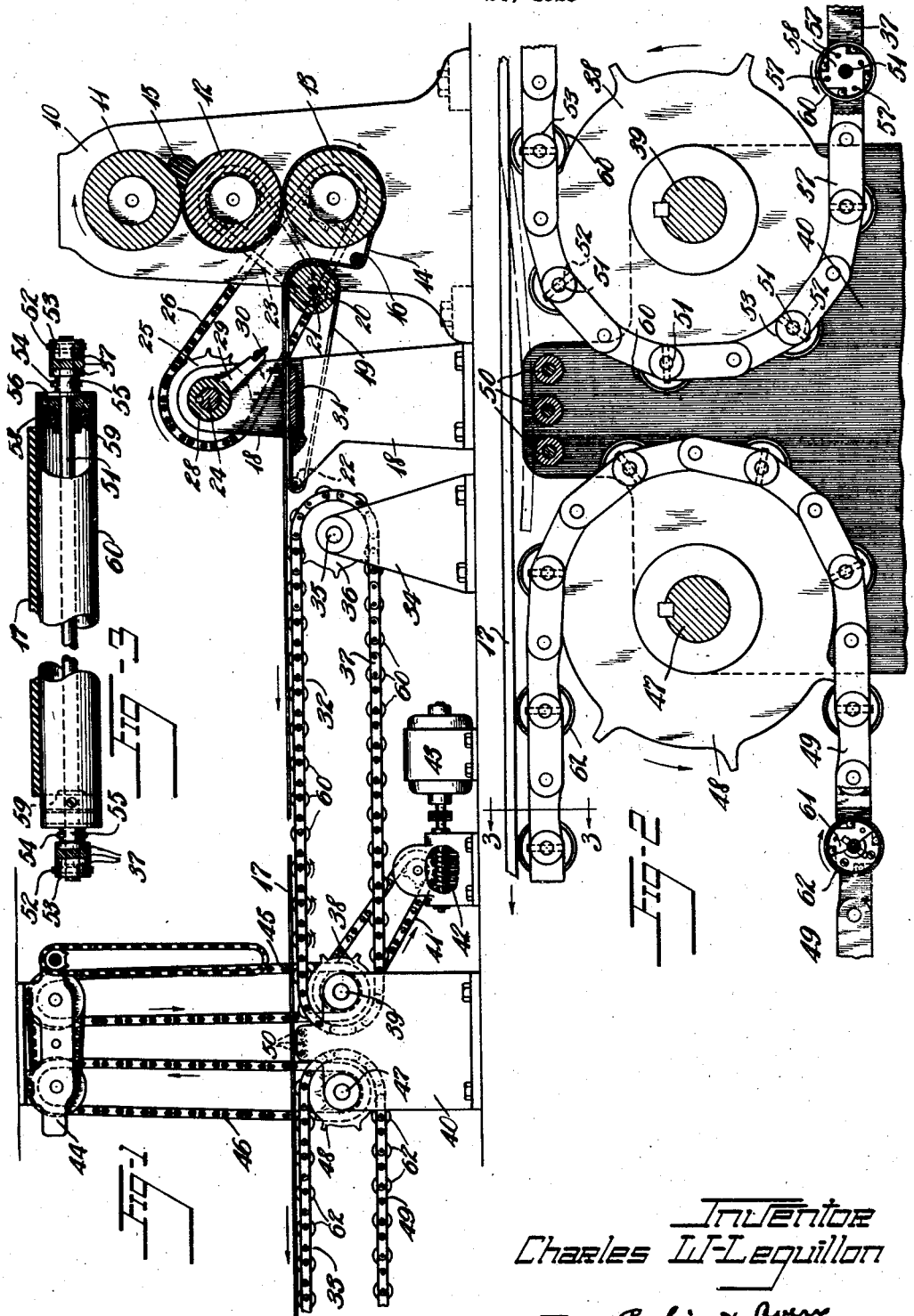
Inventor
Charles W. Leguillon
By Eskin & Avery Attys Patented Jan. 20, 1931

1,789,822

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

APPARATUS FOR MANIPULATING EXTENSIBLE STRIP MATERIAL

Application filed December 24, 1928. Serial No. 328,188.

This invention relates to apparatus for manipulating extensible strip material, and more especially to apparatus comprising conveyors arranged in a series of two longitudinally aligned units wherein the second unit is adapted to receive material from the first unit and to convey it therefrom at greater speed than the speed of the first unit.

The invention is of especial utility in the rubber industry for conveying relatively short strips or sheets of unvulcanized rubber composition after they have been severed from a continuous strip or sheet of the same, in a manner to effect a spaced apart relation of the respective severed strips or sheets, in that it avoids undesirable longitudinal strain and stretch in the material conveyed.

The chief objects of this invention are to provide a sectional conveyor, comprising two aligned units of which one unit moves at greater speed than its preceding unit, which will be adapted to feed plastic or extensible material from one unit to the succeeding unit without subjecting the material to such longitudinal strain as to stretch the same.

I attain this and other objects which will be manifest by providing such a conveyor with means for permitting relative movement, without sliding friction, between the conveyor and the material being conveyed, such relative movement of the material and conveyor preferably being limited to one direction only.

Of the accompanying drawings:

Fig. 1 is a front elevation of sheet producing and severing apparatus, and my improved conveyor, in its preferred form associated therewith, parts being broken away and parts in section.

Fig. 2 is a detail view, on a larger scale, of the adjacent ends of the two conveyor units shown in Fig. 1, parts being broken away and parts in section.

Fig. 3 is section on line 3—3 of Fig. 2, a part being broken away.

Referring to the drawings, 10 is one frame member of a rubber-working calender of known construction provided with three rolls 11, 12 and 13 respectively adapted to form a continuous sheet of material 14 from a bank of plastic material 15 fed into the bight of rolls 11, 12. A guide-roller 16 journaled at its ends in the respective calender-frames 10 is provided for assisting the withdrawal of the sheet 14 from the calender-roll 13. The calender is driven in the usual manner by any suitable means (not shown).

At the delivery side of the calender is a cutting device for severing the continuous sheet 14 into individual sheets 17 of shorter length, said cutting device being mounted upon a pair of frames 18, 18 and including an endless belt-conveyor 19 which is mounted at one end upon a pulley 20 mounted upon a driven shaft 21 journaled in the calender frames 10 adjacent the calender roll 13 and guide-roller 16, and having its other end mounted upon an idler pulley 22 journaled in the frames 18. The shaft 21 is driven by a sprocket chain 23 from the hub of the calender roll 12.

Journaled in the frames 18, above the conveyor 19 and disposed transversely thereof, is a shaft 24 upon one end of which is mounted a sprocket 25 by which the shaft is driven, through the sprocket chain 26, from a sprocket 27 mounted upon the hub of the calender-roll 13. Mounted adjacent opposite ends of the shaft 24, between the frames 18, are respective collars such as the collar 28, Fig. 1, each formed with a radial arm 29 to the outer end of which is secured one end of a blade or cutting knife 30 of which the outer edge is sharp. The arrangement is such that the blade 30 moves in an orbit about the shaft 24 and at periodic intervals engages the upper reach of the moving belt-conveyor 19 to sever the continuous plastic strip 14 thereon to produce the individual lengths 17 of uniform length. The work-engaging surface of the belt may be treated with suitable material to protect the belt from the edge of the blade 30, and a backing plate 31 is supported from the frame members 18 below the upper reach of the belt to provide a firm support for the belt in the region where it is engaged by the blade 30.

Positioned close to the delivery end of the belt conveyor 19, and moving at the same speed as the latter, is the receiving end of the first unit 32 of my improved conveyor, the second unit 33 being aligned therewith at the delivery end thereof. The unit 32 comprises a pair of spaced-apart bearing-brackets such as the bearing-bracket 34, Fig. 1 positioned close to the frames 18 and formed with journals for a shaft 35 having secured thereon near its respective ends a pair of sprockets such as the sprocket 36. Respective endless sprocket chains 37, 37 are mounted at one end upon the sprocket 36, and at their other ends are mounted upon respective sprockets, such as the sprocket 38, the latter being mounted upon a driven shaft 39 journaled in a suitable frame 40.

The shaft 39 is driven through a sprocket chain 41 from a reduction-gear device 42 which is connected with a motor 43. The shaft 39 also is connected to one side of a variable speed device 44 through a sprocket chain 45, and a sprocket chain 46 connects the other side of the variable speed device 44 to a shaft 47 journaled in the frame 40 parallel to the shaft 39, and comprising a part of the second unit 33 of my improved conveyor, the unit 33 being driven at greater speed than the unit 32. The shaft 47 carries a pair of sprockets, such as the sprocket 48, and mounted thereon are respective sprocket chains 49, 49 whose other ends (not shown) may be similarly mounted.

Journaled in the frame 40 between the delivery end of the conveyor-unit 32 and the receiving end of the conveyor-unit 33, in the plane of the upper reaches of the sprocket chains 37, 49, are a plurality of idler rolls 50, 50 adapted to support the material 17 as it passes from one unit to the other.

Corresponding alternate links of the sprocket chains 37, 37 are connected to each other by rods 51, 51 which are non-rotatably secured in said links by pins 52, 52 extending through the respective ends of the rods and through annular bosses 53, 53 formed on the outer faces of the links. Secured by pins 54, 54 to the respective end portions of each rod 51 adjacent the sprocket chains 37, are collars 55, 55 each formed on its inner end with a relatively large radial flange 56, and secured to said flange by screws or pins 57, 57, (Fig. 2), is a ball-clutch 58. Journaled upon the rod 51, by means of bushings 59, 59 to which it is secured, is a tubular sleeve or shell 60, the end portions of which enclose the ball clutch 58 in such proximity as to be engaged by the balls thereof. The shells 60 are adapted to support the material 17 upon the upper reach of the conveyor-unit 32, and the arrangement is such that the shells are free to rotate in the direction of conveyor's travel in the upper reach thereof, but are locked against reverse rotation.

In like manner the sprocket chains 49 of the conveyor-unit 33 may be provided with ball-clutches 61 and rotatable shells 62, and the clutches so arranged that the shells 62 are free to rotate only in the reverse direction with relation to the shells 60, or in the opposite direction to the travel of the upper reach of the conveyor-unit 33, so that they will not exert an excessive pull upon a piece of stock before it is severed from the continuous strip in case the machine is adjusted to cut stock pieces of long length. However, the apparatus will function satisfactory if the shells 62 are free to rotate in either direction.

In the operation of the apparatus, a continuous sheet of plastic material is formed on the calender and fed therefrom onto the belt-conveyor 19 where it is severed by the blade 30 into individual units 17 of determinate uniform length, said units 17 then passing onto the conveyor unit 32 in continuous, abutting succession. As the leading end of any piece of material 17 passes from the delivery end of the conveyor-unit 32, it engages the idler rollers 50, and after passing thereover, moves into engagement with the receiving end of the conveyor-unit 33 which is traveling at greater speed than the conveyor unit 32.

As long as the journal friction of the rollers 50 and shells 60 which are in contact with the sheet 17 exceeds the journal friction of the shells 62 in contact therewith, the shells 62 will rotate on their journals as they pass beneath the sheet and the latter will be fed forward only at the speed of the conveyor unit 32. As soon as the material 17 on the conveyor unit 33 is of such quantity that the journal friction of the shells 62 contacting it exceeds that of the shells 60 of the conveyor unit 32 which are in contact with the trailing portion of the sheet, and that of the idler rollers 50, the shells 62 will cease rotating and the sheet 17 will be drawn off the conveyor unit 32 at greater speed than the speed of the latter, the shells 60, by rotation on their own axes, permitting the sheet to be so drawn without imposing such frictional drag on the sheet as to strain or stretch the same.

The apparatus functions in the same manner even though the leading end of the sheet 17 passes onto the conveyor unit 33 before its trailing end is severed from the continuous sheet 14, thus permitting wide latitude in the size of the sheets 17 which the apparatus is adapted to handle.

The invention provides a simple, automatic, and self contained means for obtaining the results desired.

The invention may be modified within the scope of the appended claims.

I claim:

1. Apparatus for manipulating extensible strip material, said apparatus comprising conveyor means for longitudinally feeding a strip of the material, means for severing the strip into lengths as it is so fed, the said conveyor means comprising work-supporting members adapted to resist relative backward movement of the work thereon more strongly than they resist its relative forward movement, a second conveyor means adapted to receive the severed lengths from the delivery end of the first said conveyor means, means for driving the first said conveyor means at a determinate speed, and means for driving the said second conveyor means at a faster speed.

2. Apparatus as defined in claim 1 in which the severing means comprises a rotary cutter acting against a part of the first mentioned conveyor means.

3. Apparatus as defined in claim 1 in which the work-supporting members are rollers journaled upon adjacent members of the first mentioned conveyor means and in which one-way clutch members are associated with the rollers.

4. Apparatus as defined in claim 1 in which the second conveyor means comprises work-supporting members adapted to permit relative backward movement of the work although exerting upon it a determinately limited forward feeding force.

5. Apparatus as defined in claim 1 in which the second conveyor means comprises idler work-supporting rollers journaled upon adjacent members of the said second conveyor means.

6. Apparatus for manipulating extensible strip material, the said apparatus comprising conveyor means for longitudinally feeding a strip of the material, the said conveyor means comprising work-supporting members adapted to resist relative backward movement of the work thereon more strongly than they resist its relative forward movement, a second conveyor means adapted to receive the strip from the delivery end of the first said conveyor means, means for driving the first said conveyor means, and means for driving the second conveyor means at a faster speed than that of the first conveyor means.

7. Apparatus as defined in claim 6 in which the work-supporting members are rollers journaled upon adjacent members of the first-mentioned conveyor means and in which one-way clutch members are associated with the rollers.

8. Apparatus as defined in claim 6 in which the second conveyor means comprises work-supporting members adapted to permit relative backward movement of the work although exerting upon it a determinately limited forward feeding force.

9. Apparatus as defined in claim 6 in which the second conveyor means comprises idler, work-supporting rollers journaled upon adjacent members of the said second conveyor means.

In witness whereof I have hereunto set my hand this 20th day of December, 1928.

CHARLES W. LEGUILLON.